Patented Apr. 7, 1936

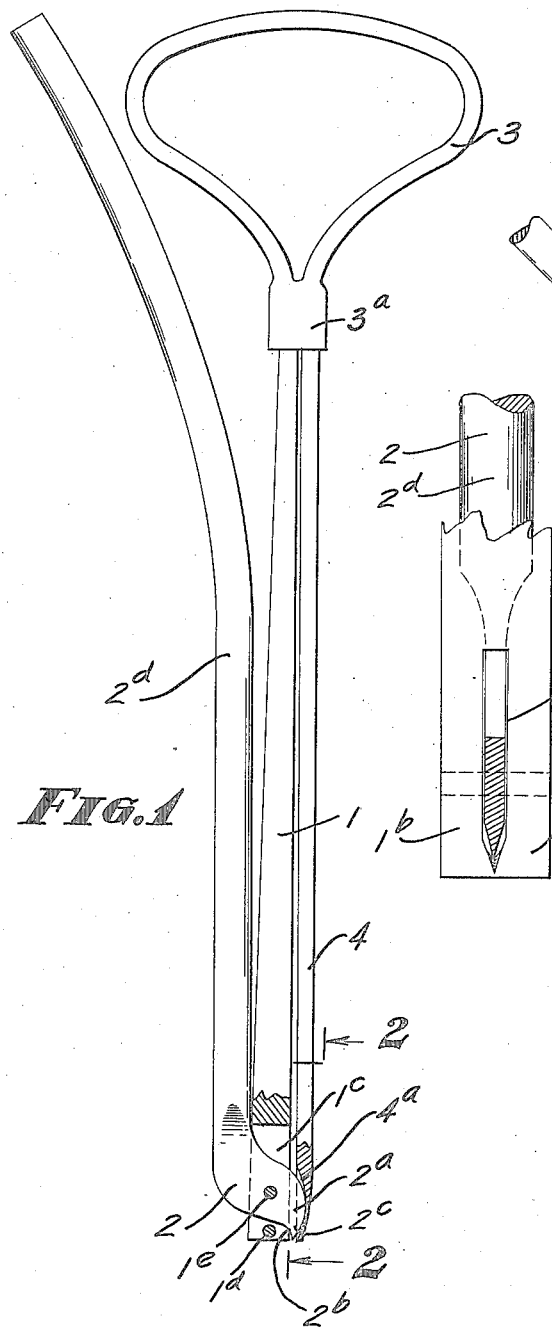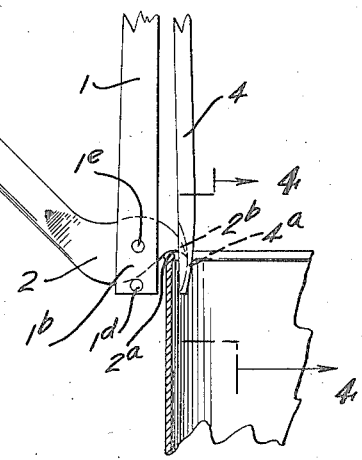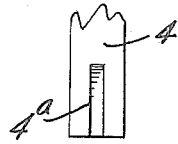

2,036,296

UNITED STATES PATENT OFFICE 2,036,296

PLANT CAN CUTTING DEVICE

Alexander Pisani, San Diego, Calif.

Application October 10, 1934, Serial No. 747,715

3 Claims. (Cl. 30—13)

My invention relates to a device for cutting plant cans in which a plant is started in a can and when transplanted it is desirable to cut the can and remove the dirt surrounding the roots as a whole, and the objects of my invention are:

First, to provide a plant can cutting device of this class which is constructed to cut the heavy reinforcing around the upper edge of a can by a shearing action with sufficient leverage to readily sever this heavy reinforced portion, after which the shearing member may be held in certain position and the device pressed downwardly along the can and guided thereby to cut the side of the can from top to bottom;

Second, to provide a device of this class with spring guide means between which the side of the can passes as it is being cut;

Third, to provide a device of this class in which the device is readily guided during the cutting operation;

Fourth, to provide a device of this class which may be spread for cutting the side of the can to the bottom and then sheared by special leverage shearing action to sever a thicker or reinforced portion at the edge of the bottom of the can and then the operation continued across the bottom by turning the can on its side, thus severing one side and across the bottom of the can with the reinforcing at both the top and lower sides of the can;

Fifth, to provide a device of this class with a handle member so that the device may be readily positioned downwardly for severing the side of the can;

Sixth, to provide a device of this class in which the can may be cut at the sides and bottom without necessity of the handle coming in contact with the cut portion of the can, thus eliminating any danger of cutting the hands of the operator in severing the can, and Seventh, to provide a device of this class which is very simple and economical of construction, easy and simple of operation, and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application, in which:

Figure 1 is a side elevational view of my plant can cutting device showing portions broken away and in section to facilitate the illustration; Fig. 2 is a fragmentary enlarged sectional view of the lower end thereof through 2—2 of Fig. 1; Fig. 3 is a fragmentary side elevational view of the lower cutting end of the device shown positioned in connection with a sectional view of a can showing it in position ready to cut the rolled or reinforced edge of the can, and Fig. 4 is a fragmentary sectional view from the line 4—4 of Fig. 3.

Similar characters of reference refer to similar parts and portions throughout the several views of the drawing.

The main supporting and shearing member 1, shiftable shearing member 2, handle member 3, and spring guide member 4, constitute the principal parts and portions of my plant can cutting device.

The main supporting and shearing member 1 is a flat metallic member preferably gradually enlarging downwardly, as shown best in Fig. 1 of the drawing. It is provided at its lower end with a slot 1a forming bifurcated portions 1b and 1c, and one edge of this is provided with sufficiently hard surface to provide cutting and shearing surface on the inner edges of the members 1b and 1c. These members are secured together at their lower ends by a reinforcing pin 1d. The upper end of this member is rigidly secured in the ferrule 3a of the handle member 3, which handle member 3 is of sufficient width to be grasped by the hand with the fingers positioned in the loop portion thereof so that this handle may be used for forcing the device downwardly along the side of the can for severing the can. Pivotally mounted between the bifurcated portions 1b and 1c of the member 1 on a pin 1e is the shiftable shearing member 2 which is provided with a curved offset portion 2a with a curved cutting edge 2b positioned and arranged to shear with a short bite any object between the point 2c and the edges of the members 1b and 1c. This shearing member is provided with a relatively long curved handle portion 2d which extends upwardly in close approximation to the handle member 3 when in closed position but is shifted outwardly, as shown best in Fig. 3 of the drawing, when in operation, thus providing a long leverage shearing member for cutting the reinforced or heavy portions of the can.

Secured in the ferrule 3a and approximately parallel with the member 1 is a guide member 4 which is lighter than the member 1 and adapted to give, as shown in Fig. 3 of the drawing, when the handle member 2d is moved away from the member 1. In the lower end of this member 4 is provided a curved slot 4a in which the point 2c of the member 2 moves and the member 4 forms a guide for holding the device in position on the side of the can when the device is pushed downwardly by pressure on the handle 3 for severing the side and bottom of the can.

The operation of the device is as follows: The device is positioned at its lower end over the side of the can, as shown best in Fig. 3 of the drawing, with the shearing member 2 spread from the member 1. Then the lever is brought upwardly toward the handle cutting the reinforced upper edge of the can, then by pressure upon the handle the cutting edge of the member 2 severs the side of the can guided by the members 1 and 4. When the bottom edge is reached the reinforcing is again sheared by operation of the handle 2d, the can turned over on its side and by pressure on the handle the bottom is sheared across, after which the can may be readily removed from the dirt surrounding the roots of the plant and the plant transplanted with the dirt intact.

Though I have shown and described a particular construction, combination and arrangement of parts and portions, I do not wish to be limited to this particular construction, combination and arrangement but desire to include in the scope of my invention the construction, combination and arrangement substantially as set forth in the appended claims.

Having thus described my invention, what I claim as new and desire to secure by Letters Patent is:

1. In a plant can cutting device, a main supporting member, a spring guide member positioned along one side thereof provided with a slot near one end, a loop handle securing said members in certain relation at their upper ends, and a shearing member secured on said support with an offset portion extending into said slot in said spring guide member.

2. In a plant can cutting device, a main supporting member, a spring guide member positioned along one side thereof provided with a slot near one end, a loop handle securing said members in certain relation at their upper ends, a shearing member secured on said support with an offset portion extending into said slot in said spring guide member, and an extended handle for said shearing member extending upwardly along said support.

3. In a device of the class described, a main support provided with a handle on its upper end and bifurcated at its lower end, a shearing member pivotally mounted between the bifurcated portions of said support and forming with said support a shearing surface, and a spring and guide member secured in said handle and extending downwardly along said support and provided with a slot adapted to receive a portion of said shearing member whereby the shifting of said shearing member will separate said guide member from said support.

ALEXANDER PISANI.